United States Patent Office.

WILLIAM E. LOCKWOOD, OF PHILADELPHIA, PENNSYLVANIA, ASSIGNEE, BY MESNE ASSIGNMENTS, OF WALTER HUNT.

*Letters Patent No.* 89,768, *dated May* 4, 1869; *reissue No.* 3,552, *dated July* 13, 1869.

IMPROVEMENT IN COMPOUND FABRICS FOR THE PRODUCTION OF SHIRT-COLLARS.

The Schedule referred to in these Letters Patent and making part of the same.

*To all whom it may concern:*

Be it known that WALTER HUNT, deceased, late of the city, county, and State of New York, did invent a new and useful Compound Fabric for the Production of Shirt-Collars, Bosoms, Wristbands, &c.; and that I, WILLIAM E. LOCKWOOD, of Philadelphia, Pennsylvania, assignee, by mesne assignment, of the said WALTER HUNT, do hereby declare the following to be a full, clear, and exact description of the said invention, which consists of a fabric composed of cotton or linen cloth, as a facing, so secured by cementing, sizing, pasting, starching, or otherwise, to a backing consisting of one or more thicknesses of cotton, or other equivalent material or fabric, that seamless shirt-collars, bosoms, wristbands, &c., may be made from the said compound fabric, without requiring any further laundry-work in completing them for sale or use, instead of cutting them out from the plain material, making up, and then performing the laundry-work in separate pieces, as in the usual manner.

The mode of uniting and forming the fabric may be by a process similar to that of making pasteboard, namely, by sizing each thickness with a brush or otherwise, laying one upon the other upon a smooth table, and pressing them together by means of a roller, and when sufficiently dry, polishing the compound fabric by means of a press, polishing-calender, mangle smoothing-iron, or other similar process.

The most advantageous process, however, in forming said fabric, is that of passing the pieces of cotton, or other equivalent material, or fabric, or linen cloth to be united, separately through a sizing or starching-vat, and then uniting the ends, and passing the whole through a roller-press, so graduated as to remove the superfluous starch, and unite the whole into one sheet or piece, which, after being suspended and sufficiently dried, may be ironed or polished in the manner above described, or otherwise.

When the same materials are used in making collars by said process that are used in making them in the ordinary way, it will be obvious that the said WALTER HUNT'S plan of first preparing and finishing the fabric in the piece, as above described, of any required quantity, will greatly facilitate the work of the manufacture, inasmuch as the uniting and ironing or polishing is done in the larger pieces, which may be cut out into collars with greater advantage by machinery, than can be possibly done from the plain cloth, and ironed separately in the usual way; consequently, this invention will be found peculiarly advantageous in the extensive manufacture of said article.

The said WALTER HUNT was aware that two or more thicknesses of muslin or linen had been united and made into a fabric for envelopes, book-covers, playing-cards, and other like purposes, and he was also aware that a cloth-lined paper fabric, water-proof or enamelled, such as described in his patent for the same, dated July 25, 1854, had been used for making water-proof shirt-collars, &c., neither of which fabrics did the said WALTER HUNT claim, nor do I now claim in this application, inasmuch as neither of them was intended or suitable for the purposes to which the above-described collar-fabric is peculiarly adapted.

For instance, from the improved fabric can be made collars, &c., having a facing of textile fabric, whereas the fabric patented by WALTER HUNT, July 25, 1854, has a paper surface.

Again, from a compound fabric made with a textile facing and a backing of the same, the collars may be cut out, the edges turned in, and stitched by machinery, ready for use, without requiring any laundry-work whatever, until they are worn and require washing, &c., for which they are as well adapted as any hand-made collar.

Independent of the adaptation of this fabric to stitched collars of the finest and most expensive kind, a cheaper fabric can be made with a facing of muslin and backing of the same, or equivalent material or fabric, the compound fabric thus produced being well adapted for the manufacture of a cheaper seamless collar, united by means of eyelets, &c., as described in the patent granted to the said HUNT, January 1, 1856.

I claim as the invention of the said WALTER HUNT, and desire to secure by Letters Patent, as a new article of manufacture—

1. A fabric whereof to make shirt-collars, wristbands, bosoms, &c., the said fabric consisting of cotton or linen cloth as a facing, secured to a backing of the same material, or equivalent material or fabric, by cementing, sizing, pasting, starching, or otherwise, all prepared substantially as set forth.

2. Also, as new articles of manufacture, shirt-collars, bosoms, wristbands, &c., made from the above-described compound fabric.

In testimony whereof, I have signed my name to this specification, before two subscribing witnesses.

WILLIAM E. LOCKWOOD.

Witnesses:
H. HOWSON,
JOHN WHITE.